(12) United States Patent
Shizuka et al.

(10) Patent No.: US 7,657,093 B2
(45) Date of Patent: Feb. 2, 2010

(54) MAGNETIC INK CHARACTER RECOGNITION APPARATUS AND MAGNETIC INK CHARACTER RECOGNITION METHOD

(75) Inventors: Sachie Shizuka, Suwa (JP); Takashi Takehana, Suwa (JP); Masahiro Katagiri, Suwa (JP)

(73) Assignee: Seiko Epson Corporation, Tokyo (JP)

(*) Notice: Subject to any disclaimer, the term of this patent is extended or adjusted under 35 U.S.C. 154(b) by 604 days.

(21) Appl. No.: 11/253,403

(22) Filed: Oct. 19, 2005

(65) Prior Publication Data

US 2006/0088199 A1   Apr. 27, 2006

(30) Foreign Application Priority Data

Oct. 26, 2004   (JP) .............................. 2004-311184

(51) Int. Cl.
   *G06K 9/18*   (2006.01)
(52) U.S. Cl. ....................... 382/182; 382/305; 382/289; 382/137; 705/45
(58) Field of Classification Search ................. 382/182, 382/137, 289, 305; 705/45
   See application file for complete search history.

(56) References Cited

U.S. PATENT DOCUMENTS

| 4,315,246 | A | * | 2/1982 | Milford ....................... 382/140 |
| 4,408,342 | A | * | 10/1983 | Grabowski et al. .......... 382/140 |
| 5,208,869 | A | * | 5/1993 | Holt ............................ 382/138 |
| 5,444,794 | A | * | 8/1995 | Uhland, Sr. .................. 705/45 |
| 5,455,875 | A | * | 10/1995 | Chevion et al. ............. 382/311 |
| 5,530,773 | A | * | 6/1996 | Thompson ................... 382/138 |
| 6,257,783 | B1 |  | 7/2001 | Hanaoka et al. |
| 6,574,377 | B1 | * | 6/2003 | Cahill et al. ................. 382/305 |
| 6,999,635 | B1 | * | 2/2006 | Kozlowski ................... 382/289 |
| 2004/0217170 | A1 |  | 11/2004 | Takiguchi et al. |
| 2005/0108168 | A1 | * | 5/2005 | Halpin et al. ................. 705/45 |

FOREIGN PATENT DOCUMENTS

| EP | 0 651 345 | 5/1995 |
| JP | 7-182448 | 7/1995 |
| JP | 9-282387 | 10/1997 |
| JP | 2000-344428 | 12/2000 |
| JP | 2004-259254 | 9/2004 |

* cited by examiner

*Primary Examiner*—Samir A. Ahmed
*Assistant Examiner*—Aklilu k Woldemariam (57) ABSTRACT

Column misalignment between a character string recognized by a MICR and a character string recognized by optical character recognition is corrected to improve character recognition reliability. A magnetic data reading unit detects the magnetism of a character string printed in magnetic ink and outputs the detected magnetic data. An image reading unit optically reads the same character string printed in magnetic ink and outputs the image data. A magnetic data recognition unit applies a character recognition process to the magnetic data output by the magnetic data reading unit and outputs magnetic data recognition result. An image data recognition unit applies character recognition to the image data output by the image reading unit and outputs image data recognition result. A recognition result comparing unit applies a column offset detection process to detect misalignment between the character columns in the magnetic data recognition result and image data recognition result, then applies a column offset correction process to correct the column offset and align corresponding character columns, and then compares corresponding character columns in the magnetic data recognition result and image data recognition result based on the character strings after correcting the column offset and outputs a final recognition result.

7 Claims, 6 Drawing Sheets

MAGNETIC INK CHARACTER RECOGNITION APPARATUS AND MAGNETIC INK CHARACTER RECOGNITION METHOD

RELATED APPLICATION

Japanese patent application No. 2004-311184 is hereby incorporated by reference in its entirety.

BACKGROUND OF THE INVENTION

1. Field of the Invention

The present invention relates to technology for recognizing characters printed in magnetic ink on the surface of a check.

2. Description of the Related Art

Check processing devices that have a magnetic ink character reader (MICR) for reading magnetic information denoting characters printed with magnetic ink on the surface of a check, and for recognizing the magnetic ink characters from this magnetic information are now common. Some check processing devices also use an optical character reader (OCR) to improve character recognition accuracy by additionally optically reading and recognizing the characters. These check-processing devices combine the magnetic data recognition result and the optical data recognition result to improve the reliability of the character recognition process. See, for example, Japanese Unexamined Patent Application 2000-344428.

However, combining the magnetic data recognition result and optical data recognition result does not improve character recognition reliability under certain circumstances. If, for example, reliability is improved by comparing the magnetic data recognition result and optical data recognition result character by character, a mismatch will be confirmed between substantially all of the characters if a shift of just a single character column occurs between the optical and magnetic data recognition results.

SUMMARY OF THE INVENTION

The present invention solves this problem and improves character recognition reliability by correcting such shifts in the character column alignment.

According to one aspect of the present invention, a character recognition apparatus that is able to recognize a character string composed of a plurality of characters printed with magnetic ink on a print medium is provided. This character recognition apparatus generally comprises: a magnetic sensor for detecting magnetism from the character string printed in magnetic ink and outputting magnetic data; an optical sensor for optically reading the same character string printed in magnetic ink and outputting image data; magnetic recognition means for recognizing characters in the character string using the magnetic data output by the magnetic sensor, and outputting a magnetically-recognized character string; image recognition means for recognizing characters in the character string using the image data output by the optical sensor, and outputting an optically-recognized character string; column offset detection means for detecting a shift in column alignment of characters in the magnetically-recognized character string with respect to corresponding characters in the optically-recognized character string; column offset correction means for correcting the column offset and aligning corresponding character corresponding characters in the magnetically-recognized and optically recognized character strings, if and when the column offset detection means detects a shift in character column alignment; and comparison means for comparing characters at corresponding positions in the magnetically-recognized and optically-recognized character strings based on the column alignment after column offset correction is performed by the column offset correction means, and outputting a combined recognition result based on the comparison.

The column offset detection means preferably determines that there is an offset in the character column alignment when the number of characters in the magnetically-recognized character string and the number of characters in the optically-recognized character string are not the same; and the column offset correction means corrects the column offset by shifting one of the magnetically-recognized character string or the optically-recognized character string relative to the other by an amount equal to or less than the difference in the number of characters in the strings.

Further preferably: the magnetic sensor outputs with the magnetic data magnetic position information denoting the position where magnetism of a particular character was detected; the image recognition means detects the position of each character during character recognition, and outputs image position information denoting the corresponding detected positions; the column offset detection means thus detects a column offset by comparing the position of the first or last character of the magnetically-recognized character string based on the magnetic position information and the position of the corresponding first or last character of the optically-recognized character string based on the image position information.

In one embodiment, the column offset correction means aligns corresponding columns in the character strings based on position information contained in the magnetic position information for each character in the magnetically-recognized character string and position information contained in the image position information for each character in the optically-recognized character string.

In another embodiment, the column offset correction means shifts the correlation between the magnetically-recognized character string and the optically-recognized character string based on a first pattern selected from one or more predefined offset patterns to correct the column alignment.

Further preferably, the column offset correction means selects a second pattern to correct the column offset, when the match rate of the character strings compared by the comparison means is less than or equal to a specified rate, after correcting the column alignment according to the selected first pattern.

In another aspect, the invention involves a character recognition method for recognizing a character string comprising a plurality of characters printed with magnetic ink on a print medium. Such a method generally comprises: detecting magnetism from the character string printed in magnetic ink and outputting magnetic data; optically reading the character string printed in magnetic ink and outputting image data; recognizing characters in the character string using the outputted magnetic data, and outputting a magnetically-recognized character string; recognizing characters in the character string using the outputted image data, and outputting an optically-recognized character string; detecting a shift in column alignment of the characters in the magnetically-recognized character string with respect to corresponding characters in the optically-recognized character string; correcting the column offset and aligning corresponding character columns of the magnetically-recognized and optically-recognized character strings, if a shift in the character column alignment is detected; and comparing characters at corresponding positions in the magnetically-recognized and optically recognized character strings based on the column alignment after column offset is corrected, and outputting a combined recognition result of the character string based on the comparison.

In accordance with further aspects of the invention, the method described above or steps thereof may be embodied in a set of instructions, which is carried on a medium and conveyed to a computer or other processor-controlled device for execution. The set of instructions may be conveniently implemented in software. Alternatively, any or all of the instructions may be implemented using functionally equivalent hardware (e.g., application specific integrated circuit (ASIC), digital signal processing circuitry, etc.) or a combination of software and hardware.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
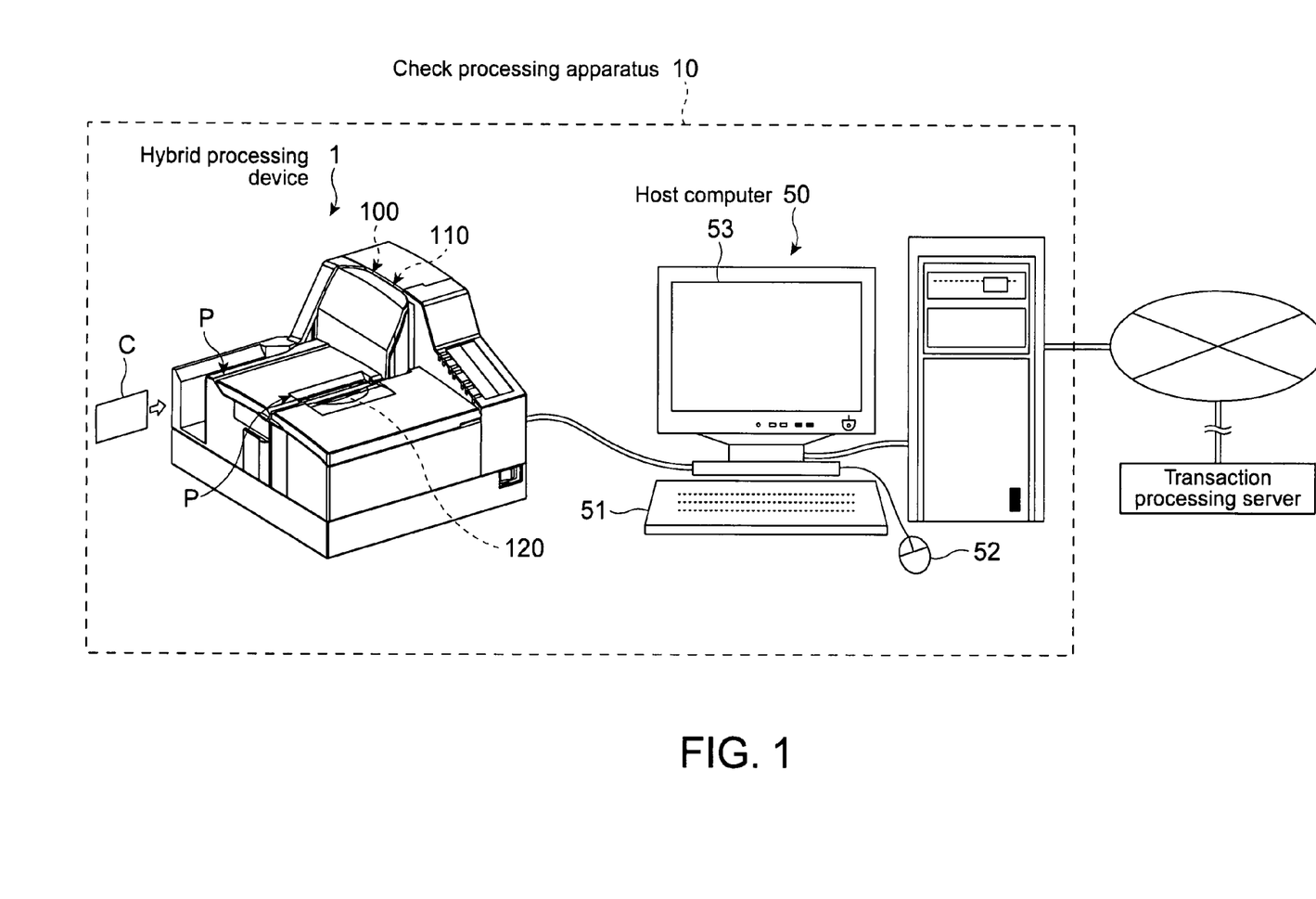
FIG. 1 is a schematic diagram of a check processing apparatus according to a preferred embodiment of the present invention.

A preferred embodiment of a check processing apparatus 10 according to the present invention is described below with reference to the accompanying figures. As shown in FIG. 1, a check processing apparatus 10 according to this embodiment of the invention is composed of a hybrid processing device 1 for scanning and printing checks C, and a host computer 50 for generating verification data and controlling the hybrid processing device 1.

The host computer 50 is composed of a keyboard 51 and mouse 52 for data entry, and a display 53 for displaying an image of the scanned check C, error messages, and other information. The host computer 50 is in communication with the hybrid processing device 1 by a wired or wireless connection. Note that a wired connection using a connector cable is shown in FIG. 1.

The host computer 50 is connected over a network (such as the Internet) to a transaction processing server, which verifies the validity of the checks C. The host computer 50 receives check data read by the MICR 13 part of the hybrid processing device 1 (see FIG. 4) and sends the check data to the transaction processing server. Whether check C is valid or invalid is known based on the response from the transaction processing server.

Checks C processed by the hybrid processing device 1 according to this embodiment of the invention and the transaction process that is run to process transactions using the checks are described next with reference to FIG. 2.

Figure 2A:
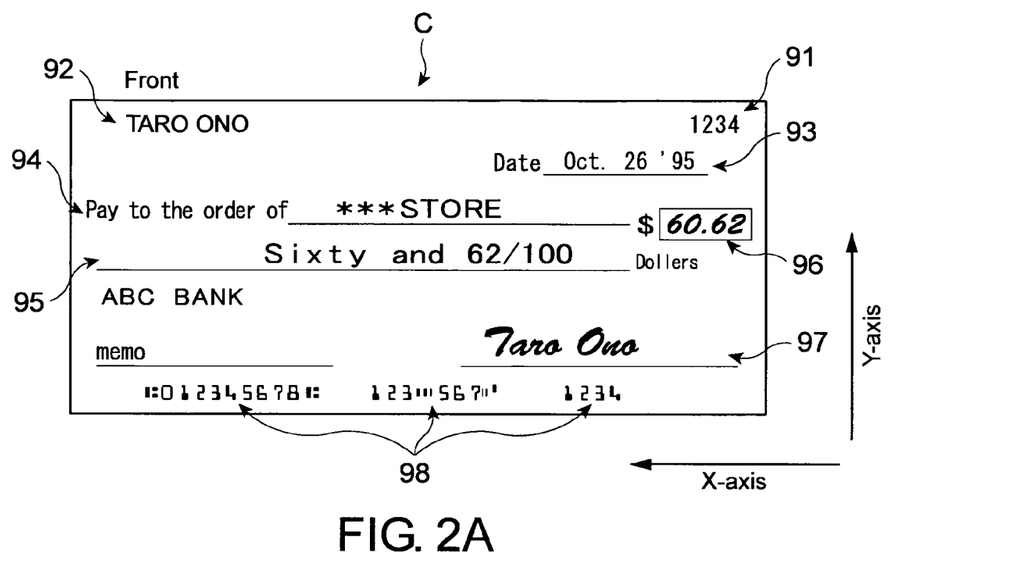
FIG. 2 is a plan view of a typical check.

As shown in FIG. 2A, a serial number 91, account holder name 92, and magnetic ink data 98 are preprinted on the front of check C. The front of check C also has a date line 93, payee line 94, payment amount lines 95 and 96, and a signature line 97. The magnetic ink data 98 generally includes the bank number, account number, and check serial number. The information printed in the magnetic ink data 98 is read by the MICR 13 (see FIG. 4) to verify the validity of check C.

The user (account holder) writes or prints the date, payee, and payment amount in the appropriate places on the front of check C, then signs the check in the signature line 97, and passes the check to the payee (a store in this example).

Figure 2B:
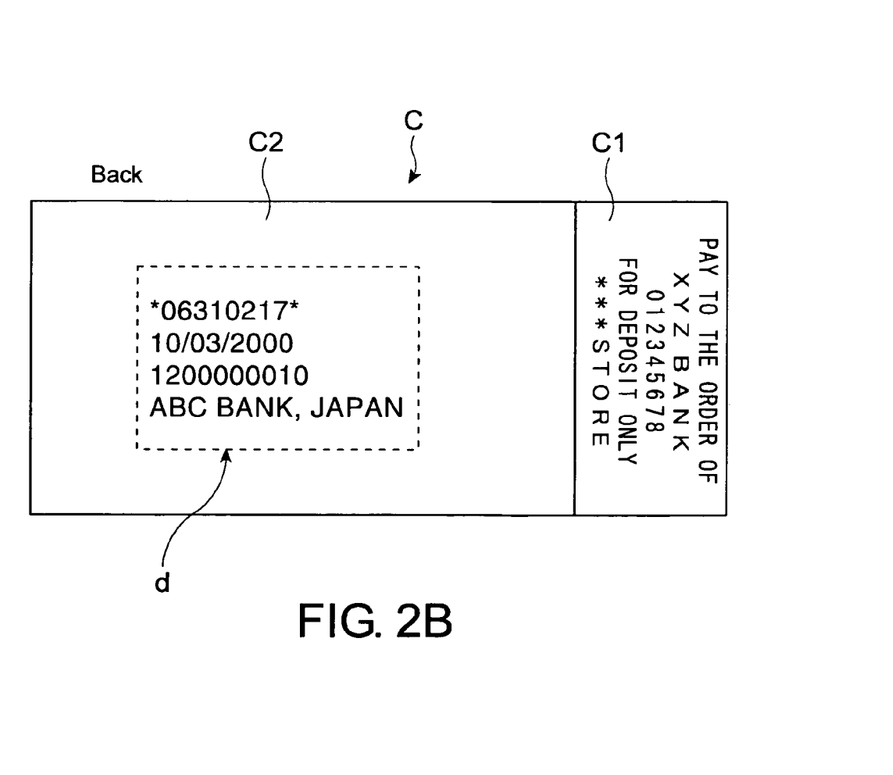

The store then prints an endorsement including deposit information proving that check C was accepted by the store in an endorsement area on the back of check C. The store then sends check C to the bank A that is used by the store, and the bank A processes check C. Referring to FIG. 2B, note that the back of check C has an endorsement area C1 that is used by the store to endorse check C, and a spray-on area C2 where the bank or clearinghouse prints check verification and clearing data. The store records the endorsement in the endorsement area C1.

After printing the payment amount in magnetic ink characters on the front of check C, the bank reads the magnetic ink data 98 preprinted on check C using the MICR 13, confirms the check validity, and prints the verification data d indicating that check C has been processed by the bank in the spray-on area C2 on the back of check C. The bank also scans the front and back of check C and stores the image data. Note that the content of the verification data d may vary according to the bank, but typically includes at least the bank name, bank number, the date the check was processed, and a tracking number.

The bank then transfers the payment (check) amount from the user's checking account to the account of the store where check C was used for payment. If the bank used by the user and the bank used by the store are different, check C data, specifically the payment amount and check number, are sent to the bank on which check C is drawn for transaction processing.

The arrangement of the hybrid processing device 1 is described next. As shown in FIG. 1 the hybrid processing device 1 has a U-shaped transportation path P. Disposed facing the transportation path P are an image reading unit 100 (see FIG. 3) for optically imaging check C, a magnetic data reading unit 110 for magnetically reading the magnetic ink characters printed on check C (see FIG. 3), and a printing unit 120 for printing the verification data on check C. A transportation mechanism 20 for conveying checks C through the transportation path P is also provided (see FIG. 3).

Figure 3:
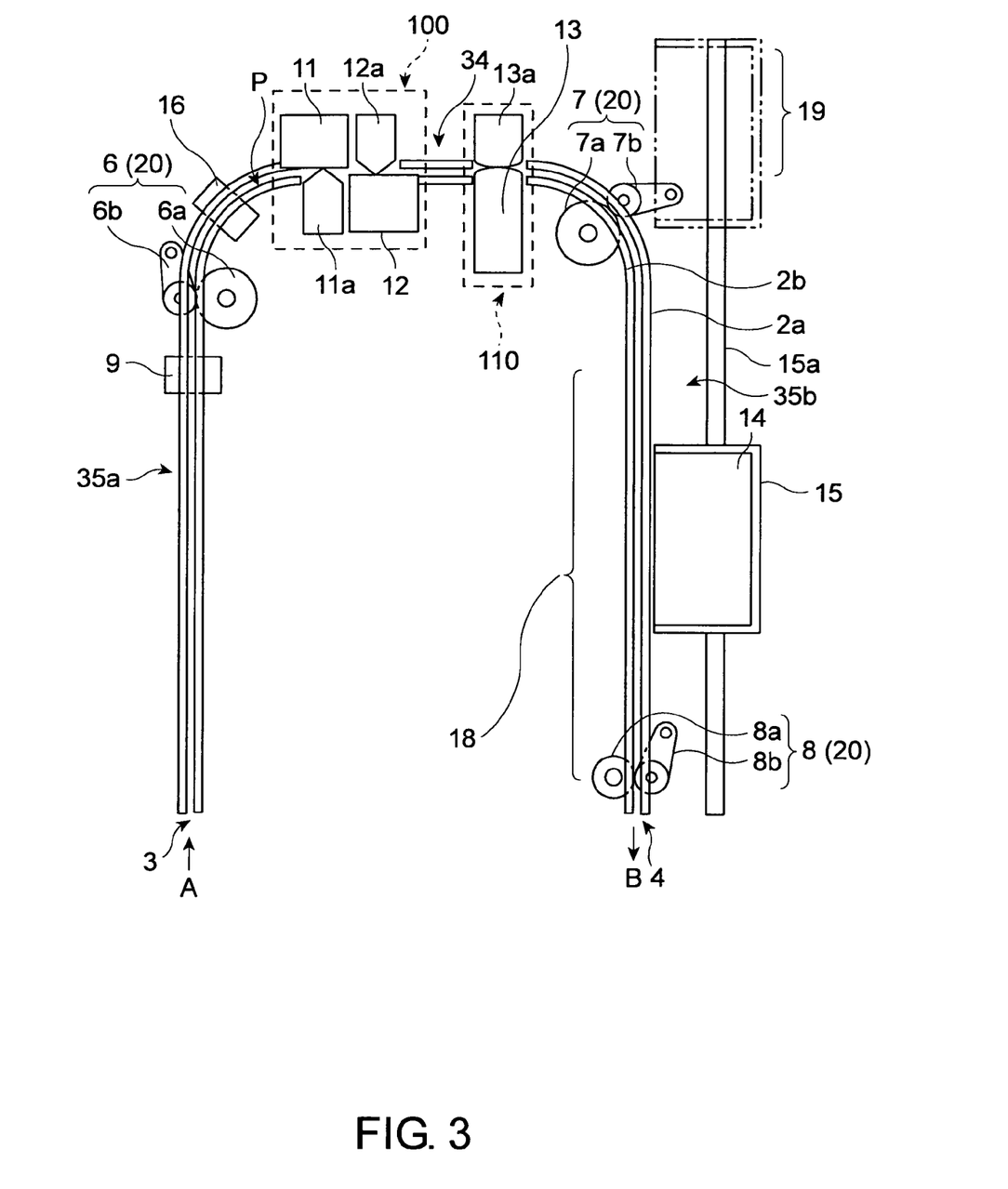
FIG. 3 is a schematic diagram of the transportation path in a hybrid-processing device containing the function of a check processing apparatus.

As shown in FIG. 3 the transportation path P is composed of a slit-like path rendered between an outside guide 2a and an inside guide 2b, and has straight portions 35a and 35b, and a U-shaped bottom portion 34 communicating straight portion 35a on one end thereof with straight portion 35b on the other end.

When the user inserts a check C from the check insertion slot 3 to the transportation path P, the transportation mechanism 20 conveys check C in the direction of arrow A through straight portion 35a to the U-shaped bottom portion 34, and thus changes the direction of check travel 180 degrees from the insertion direction indicated by arrow A. The transportation mechanism 20 then conveys check C through straight portion 35b in the direction of arrow B, and discharges check C from the check exit 4. The transportation mechanism 20 thus curves and conveys check C in the shape of a U through the transportation path P. Note that operation of this hybrid processing device 1 assumes that check C is inserted with the front of the check facing the inside guide 2b.

The transportation mechanism 20 has first transportation rollers 6, second transportation rollers 7, and discharge rollers 8. These roller pairs 6, 7, 8 each include a drive roller 6a, 7a, 8a driven by a motor, and a grip roller, which is a pressure roller (driven roller) 6b, 7b, 8b that presses check C against the opposing drive roller.

The first transportation rollers 6 are disposed at a first corner portion of the transportation path P. A BOF (bottom of form) detector 9 is disposed on the upstream side of the first transportation rollers 6, and a TOF (top of form) detector 16 is disposed on the downstream side of the first transportation rollers 6. These detectors 9, 16 detect the leading and trailing ends of check C traveling through the transportation path P. When the BOF detector 9 detects a check C, a motor 40 is driven and the first transportation rollers 6, second transportation rollers 7, and discharge rollers 8 start turning.

A back image scanner 11 and front image scanner 12 of the image reading unit 100, and the MICR 13 of the magnetic data reading unit 110, are disposed to the U-shaped bottom portion 34 between the TOF detector 16 and second transportation rollers 7.

These two scanners 11, 12 have image scanning sensors for capturing images of the back and front of the check. The back image scanner 11 is disposed on the outside guide 2a side of the transportation path P for imaging the back side of check C, and the front image scanner 12 is disposed on the inside guide 2b side of the transportation path P for imaging the front side of check C. A pressure member (roller) 11a, 12a disposed on the opposite side of the transportation path P as the corresponding scanner 11, 12 presses check C to the scanning surface for scanning.

The MICR 13 is a magnetic reading sensor for reading the magnetic ink characters printed on the front of check C, and is disposed on the inside guide 2b side of the transportation path P at an appropriate position opposite the front of check C. A pressure member (pad) 13a disposed on the opposite side of the transportation path P as the MICR 13 presses check C to the MICR 13 for reading the magnetic ink characters.

The second transportation rollers 7 are disposed to the second corner portion of the transportation path P, and the discharge rollers 8 are disposed near the check exit 4. A print head 14 constituting the printing unit 120 is disposed facing the transportation path P in the straight portion 35b between the second transportation rollers 7 and discharge rollers 8. This print head 14 is mounted on a carriage 15, which is disposed movably along a guide shaft 15a, and can thus move on the carriage 15 between a printing range 18 and a retracted position 19.

To print on a check C, the print head 14 stops at a specific position in the printing range 18 and is driven synchronized to check C transportation. As described in further detail below, if roll paper is introduced to 35b, roll paper transportation in a subscanning direction and print head 14 movement in a main scanning direction are coordinated to print the roll paper.

The discharge rollers 8 and check exit 4 are located downstream from the print head 14. The printed check C is discharged by the discharge rollers 8 from the check exit 4. A discharge detector not shown is also disposed near the discharge rollers 8 for detecting whether the printed check C has been discharged.

Note that in this embodiment of the invention the height of the outside guide 2a and inside guide 2b is lower than the height of check C in the parts of the transportation path P other than the U-shaped bottom portion 34 where the scanners 11, 12 and MICR 13 are disposed so that check C can be easily removed if a paper jam occurs, for example.

In addition to the transportation path P for conveying checks C as described above, the hybrid processing device 1 of the present invention also has a roll paper transportation path (not shown) for conveying roll paper. This roll paper transportation path shares part of straight portion 35b of the transportation path P and conveys the roll paper at substantially a right angle to the transportation direction of the transportation path P (that is, in the direction passing through the surface of the paper in FIG. 3). A roll paper compartment for storing the roll paper is also disposed between the straight portions 35a and 35b of the transportation path P. One end of the transportation path is pulled from this roll paper compartment into the roll paper transportation path and thus conveyed through the roll paper transportation path. When the roll paper passes through the printing range 18 proximally opposite the print head 14, the print head 14 moves in a main scanning direction to print on the roll paper.

A hybrid processing device 1 according to this embodiment of the invention can thus both process checks C and issue receipts by printing to roll paper.

The hybrid processing device 1 according to this embodiment of the invention also has a vertical transportation path rendered appropriately to the print head 14 when the print head 14 is positioned in the printing range 18. This vertical transportation path conveys a check vertically passed the print head 14 when a check C is inserted between the outside guide 2a and inside guide 2b from a top opening formed between the outside guide 2a and inside guide 2b near the printing range 18. This vertical transportation path is used for validation printing whereby a check C inserted from above the transportation path P is printed by the print head 14 and then discharged again to the top after printing is completed.

The print head 14 in this embodiment of the invention is mounted on a carriage 15 and can thus move horizontally through the printing range 18 along the straight portion 35b of the transportation path P. This hybrid processing device 1 thus has two printing modes for printing checks C, a stationary print head mode in which the print head 14 remains stationary while check C moves horizontally passed check C during printing, and a stationary check mode in which check C remains stationary while the print head 14 moves horizontally over the surface of check C while printing.

When printing roll paper the print head 14 prints one line at a time while moving on the carriage 15 horizontally over the roll paper surface. When multiple lines are printed, the roll paper is advanced one line in the subscanning direction after the first line is printed, the print head 14 then moves horizontally in the main scanning direction to print the second line, and this operation repeats to print each subsequent line.

Check C scanning, magnetic ink character reading, and check printing processes are described next. When the user inserts a check C in the direction of arrow A from the check insertion slot 3, check C is conveyed at a constant speed through the transportation path P.

The BOF detector 9 detects the leading end of check C when check C reaches the BOF detector 9. The detection signal from the BOF detector 9 causes the motor 40 to start as described above, and the drive roller 6a of the first transportation rollers 6 thus starts turning. Check C is thus passed to the first transportation rollers 6 and gripped smoothly between the drive roller 6a and pressure roller 6b. As a result, check C is conveyed without slipping by rotation of the drive roller 6a through the transportation path P along the outside guide 2a wall of the U-shaped bottom portion 34.

When the leading end of check C conveyed by the first transportation rollers 6 reaches the TOF detector 16, the scanners 11, 12 and MICR 13 disposed downstream therefrom turn on and enter a standby mode waiting for check detection. The hybrid processing device 1 according to this embodiment of the invention thus supplies power to the rollers and other active elements only when needed, thus saving power and preventing unnecessary power consumption.

As check C continues traveling forward, the back image scanner 11 disposed on the outside guide 2a side images the back side of check C, and the front image scanner 12 disposed on the inside guide 2b side of the transportation path P images the front side of check C. The MICR 13 disposed on the inside guide 2b side also reads the magnetic data from the magnetic ink characters preprinted on check C. As described in greater detail below, the front image data g1 and back image data g2 captured from check C is temporarily stored in the check-front image data block 242 and check-back image data block 243 of the check processing apparatus (hybrid processing device) 1, respectively, and the CPU 220 runs specific processes on this data, including a process to generate merged image data g3.

After check C passes the TOF detector 16 and the leading end thereof reaches the second transportation rollers 7, check C is nipped between the drive roller 7a and pressure roller 7b and conveyed by rotation of the drive roller 7a to the straight portion 35b of the transportation path.

When check C reaches the printing range 18 proximally opposite the print head 14, the print head 14 is driven to print check C. The print head 14 is stopped at a predetermined position in the printing range 18 at this time and is driven synchronized to movement of the print medium, that is, check C, in the main scanning direction to print.

After the back of check C is thus printed by the print head 14, check C is discharged by the discharge rollers 8 in the direction of arrow B. More specifically, check C is nipped between the drive roller 8a and pressure roller 8b so that rotation of the drive roller 8a conveys check C out from the hybrid processing device 1, thus completing processing of check C.

Figure 4:
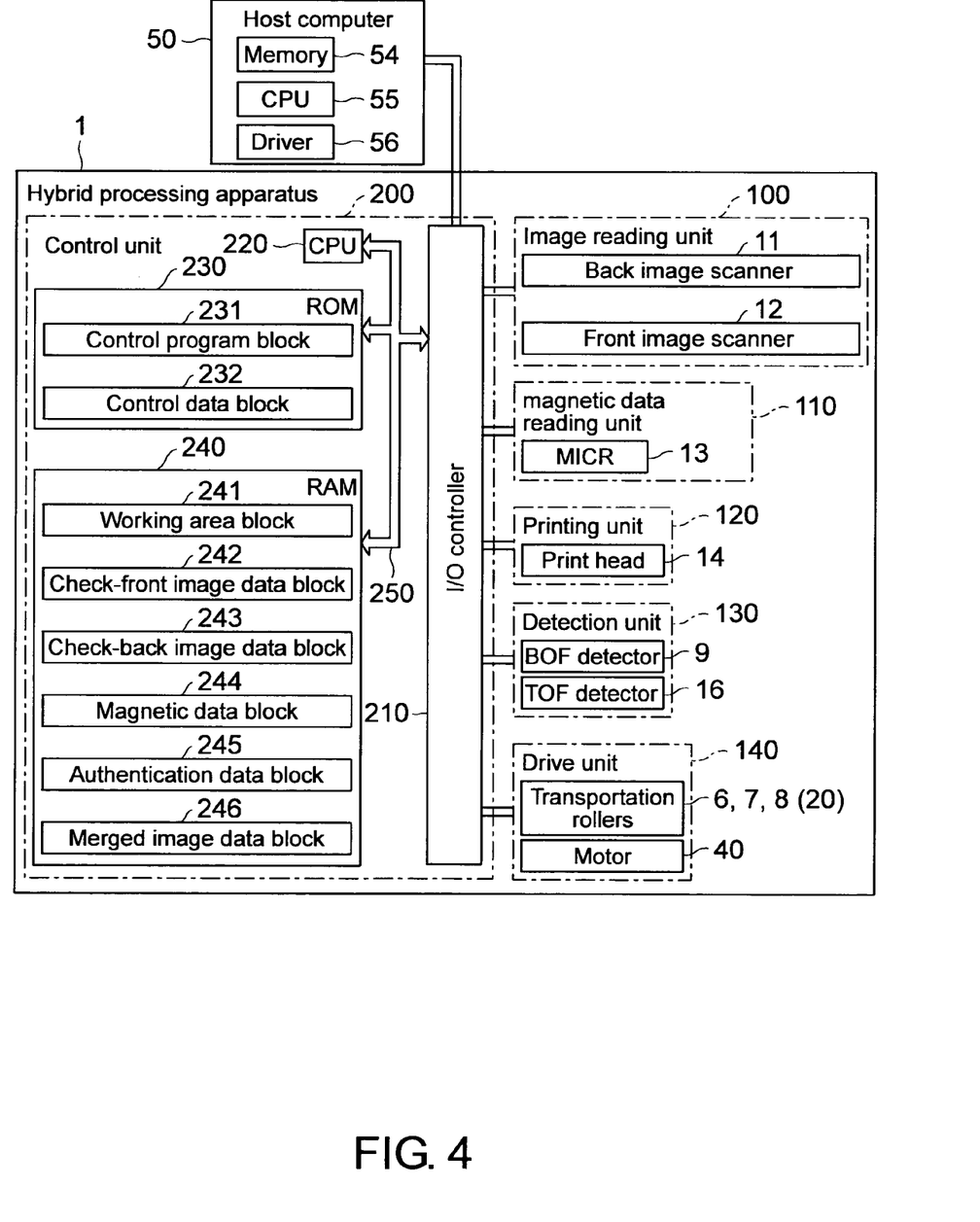
FIG. 4 is a control block diagram of the check processing apparatus.

The control arrangement of the check processing apparatus 10 composed of the hybrid processing device 1 and host computer 50 is described next with reference to FIG. 4.

This hybrid processing device 1 is composed of an image reading unit 100 for imaging check C, a magnetic data reading unit 110 for reading the magnetic ink characters printed on check C, a printing unit 120 for printing the back of a check C, a detection unit 130 for detecting the leading end and trailing end of check C, a drive unit 140 for driving the transportation mechanism 20 and motor 40, and a control unit 200 providing overall control of the hybrid processing device 1.

The image reading unit 100 is composed of the back image scanner 11 and front image scanner 12, and thus images the back and front of check C.

The magnetic data reading unit 110 is composed of MICR 13 that reads the magnetic ink characters printed on check C.

The printing unit 120 is composed of print head 14, and prints the authentication data received from the host computer 50 on the back of check C.

The detection unit 130 is composed of BOF detector 9 and TOF detector 16, and thereby detects the leading end and trailing end of check C.

The drive unit 140 is composed of the transportation mechanism 20 including first transportation rollers 6, second transportation rollers 7, and discharge rollers 8, and a motor 40 for rotationally driving the drive roller 6a, 7a, 8a portion of the plural transportation roller sets 6, 7, 8, and thus controls check C transportation.

The control unit 200 is composed of CPU 220, ROM 230, RAM 240, and input/output controller (10C) 210 interconnected over internal bus 250.

ROM 230 has a control program block 231 for storing a program for controlling reading and printing check C, generating merged image data g3 by merging the back image data g2 and verification data d received from host computer 50, and other programs run by the CPU 220, and a control data block 232 for storing tables and control data for generating merged image data g3.

In addition to working area block 241 used for flags, for example, RAM 240 has a check-front image data block 242 for storing the front image data g1 captured from check C, check-back image data block 243 for storing back image data g2 captured from check C, magnetic data block 244 for storing the magnetic data read from check C, authentication data block 245 for temporarily storing the verification data d received from host computer 50, and merged image data block 246 for temporarily storing merged image data g3 produced by merging back image data g2 and verification data d. RAM 240 is thus used as working memory by the control processes.

Logic circuits composed of gate arrays and custom IC devices, for example, for complementing the functions of CPU 220 and handling interface signals exchanged with peripheral devices are incorporated into input/output controller 210. The input/output controller 210 can thus directly pass or process and then pass image data captured by the scanners 11, 12, magnetic data read by MICR 13, and verification data and control data from the host computer 50 to the internal bus 250. In conjunction with the CPU 220, input/output controller 210 also processes and outputs or directly outputs data and control signals output from the CPU 220 to the internal bus 250 to the printing unit 120.

CPU 220 thus controls the flow of signals and data in the hybrid processing device 1 by means of input/output controller 210 according to a control program stored in ROM 230 to run the merged image data g3 generating process and check C printing process.

The host computer 50, which is in communication with hybrid processing device 1, has memory 54 such as ROM or RAM, a CPU 55 for controlling internal operation of the host computer 50, and driver 56, which is a program for controlling the hybrid processing device 1.

Memory 54 stores a control program run by the CPU 55 as well as the control data and tables used by the program in ROM. Memory 54 also includes RAM used as working memory and storage registers, as well as storage areas for information (such as the bank name and bank number) entered by the operator, and the merged image data g3 and front image data g1 for check C received from the hybrid processing device 1, and is used as working memory for the control processes.

When a verification data request command requesting transmission of the verification data is received from the hybrid processing device 1, host computer 50 generates the verification data d by adding the processing date and a process (tracking) number to the information (bank name and bank number in this example) stored in RAM, and sends the resulting verification data d to the hybrid processing device 1.

The process whereby the hybrid processing device 1 combines the character recognition result from the image data and the character recognition result from the magnetic data, and improves the reliability of magnetic ink data 98 recognition is described next below. Note that the arrangement and function described below are achieved by the CPU 220 reading and running a control program from ROM 230.

Figure 5:
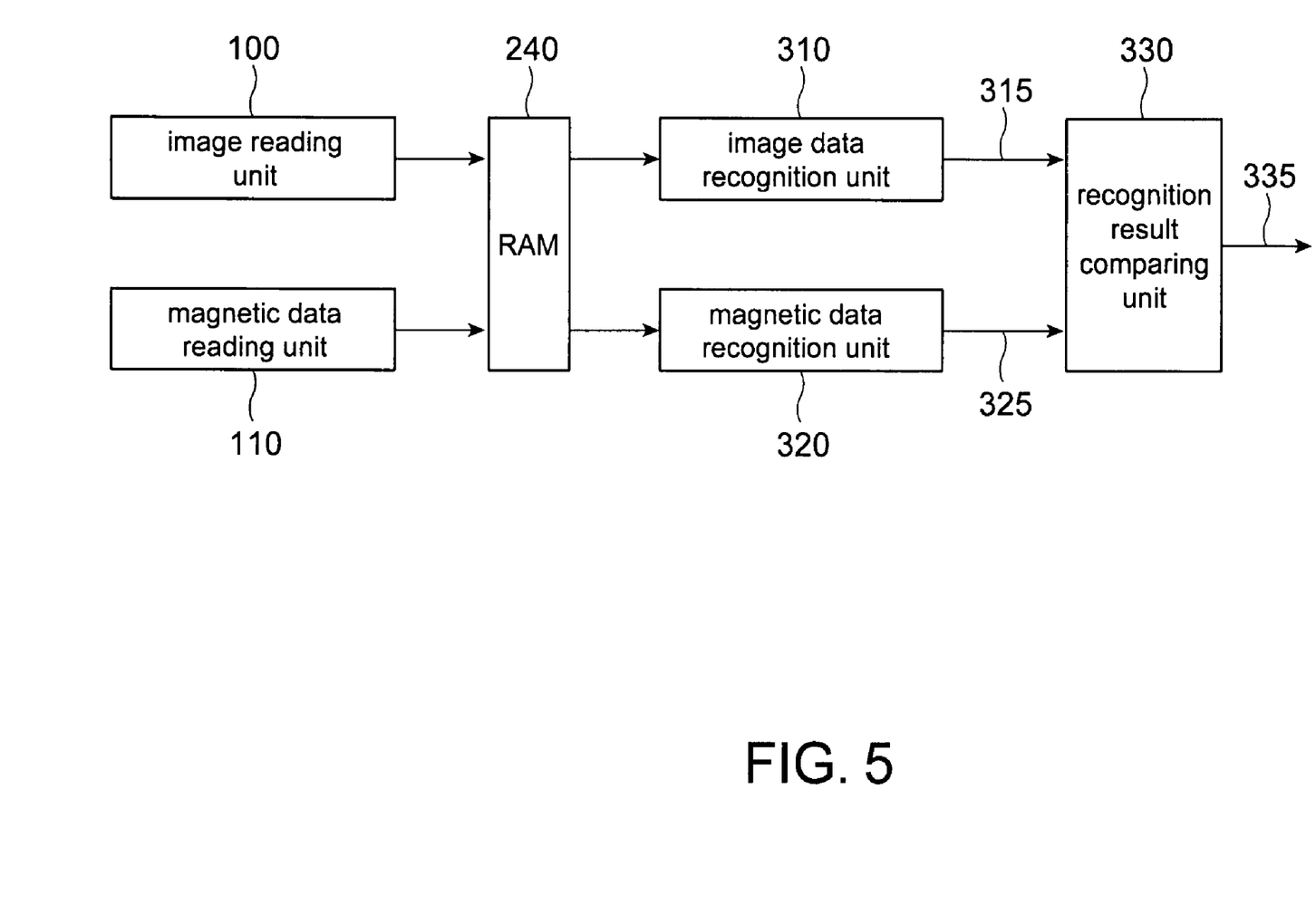
FIG. 5 is a function block diagram of the character recognition process in the hybrid processing device.

FIG. 5 is a functional block diagram of the character recognition process of the hybrid processing device 1. As described above, the front image data g1 and magnetic data read from check C by image reading unit 100 and magnetic data reading unit 110 are stored in check-front image data block 242 and magnetic data block 244 in RAM 240, respectively. Note that the magnetic data used herein includes coordinates denoting the positions where the magnetism of the magnetic ink data 98 is detected.

An image data recognition unit 310 rendered by the CPU 220 gets front image data g1 from RAM 240, analyzes the image to recognize the magnetic ink data 98, and identifies the location where the magnetic ink data 98 was detected.

A magnetic data recognition unit 320 likewise rendered by the CPU 220 gets the magnetic data from RAM 240, analyzes the magnetic data to recognize the magnetic ink data 98, and identifies the location where the magnetic ink data 98 was detected.

The character location or position refers to a position on the y-axis as shown in FIG. 2A, for example. Note, further, that identifying the character position by the image data recognition unit 310 and magnetic data recognition unit 320 is not essential, and can be omitted by one or both units.

A recognition result comparing unit 330 implemented by the CPU 220 then compares the image data recognition result 315 (the character string recognized from the image data) output by the image data recognition unit 310 with the magnetic data recognition result 325 (the character string recognized from the magnetic data) from the magnetic data recognition unit 320, and outputs the result of this comparison as combined recognition result 335. The combined recognition result 335 merges the image data and magnetic data recognition results.

Figure 6:
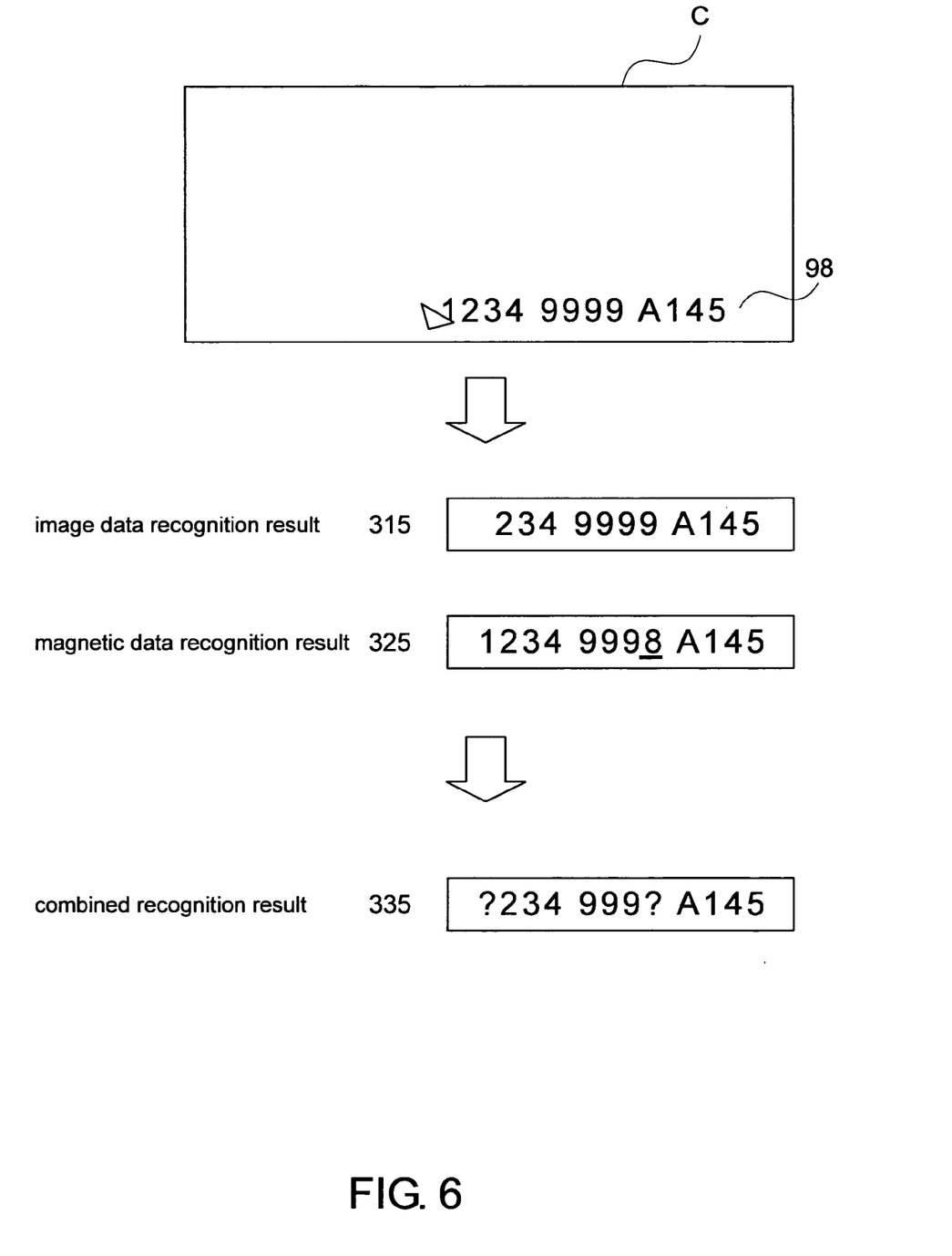
FIG. 6 is a schematic diagram of the character recognition process.

FIG. 6 schematically describes the process executed by the functional blocks shown in FIG. 5. In the example shown in FIG. 6 the magnetic ink data 98 is printed in a single line on the front of check C. The magnetic ink data 98 is read by the image reading unit 100 and magnetic data reading unit 110 with a stain or other foreign matter denoted by a triangle in FIG. 6 hiding a portion of the "1" shown as the first character in the magnetic ink data 98.

The image data recognition unit 310 extracts an image of the magnetic ink data 98 from front image data g1, for example, and recognizes the characters by pattern matching with character pattern data stored in memory. The image data recognition unit 310 then outputs the recognized character string as image data recognition result 315. In this example the image reading unit 100 cannot accurately read the first "1." The first "1" is therefore not recognized, and the string "234999A145" is output as image data recognition result 315. Position information denoting the location of the character string could also be added to image data recognition result 315. This position information could denote the location of the first or last character in the string, or the position of each individual character in the string.

The magnetic data recognition unit 320 recognizes the individual characters based on the magnetic data, and outputs the resulting character string as magnetic data recognition result 325. The first "11" is correctly recognized from the magnetic data because soiling does not obscure the magnetic signal. However, the "9" in the eighth column is incorrectly recognized as an "8" in the example shown in FIG. 6. The string "12349998A145" is therefore output as magnetic data recognition result 325. Note that, as with the image data recognition result 315, position information denoting the location of the first, last, or every character in the string could be added to the magnetic data recognition result 325.

The recognition result comparing unit 330 compares the character string of the image data recognition result 315 with the character string of the magnetic data recognition result 325 character by character, and outputs the character string of the combined recognition result 335. Operation of the recognition result comparing unit 330 includes a process for detecting a shift in the character columns of the character string in the image data recognition result 315 and the character string in the magnetic data recognition result 325, a process for correcting the detected column shifting (misalignment), and a process for comparing the character string of the image data recognition result 315 and the character string of the magnetic data recognition result 325 after the character columns are correctly aligned.

The column shifting detection process is described first below. The recognition result comparing unit 330 could compare the number of characters (columns) in the character string of the image data recognition result 315 with the number of characters in the character string of the magnetic data recognition result 325, and determine that the character columns of the two strings are offset from each other if the character counts are not the same. Alternatively, the recognition result comparing unit 330 could detect a column shift between the two strings using the position information added to the image data recognition result 315 and magnetic data recognition result 325. In this case the positions of the first (or last) characters in the image data recognition result 315 and magnetic data recognition result 325 could be compared to determine if the character strings are offset from each other.

If the two strings do not have the same number of characters, the column shifting correction process could align the strings by shifting one relative to the other by a distance equal to or less than the difference in the number of characters. If the difference in the length of the two strings is one character, for example, the strings are shifted so that the first or last characters in the character string of the image data recognition result 315 and the character string of the magnetic data recognition result 325 are aligned. If the difference in the length of the two strings is two characters, the offset can be corrected by shifting the strings 0, 1, or 2 characters.

As a further alternative, the column offset can be corrected by using the position information in the image data recognition result 315 and magnetic data recognition result 325 to align the columns that are apparently corresponding. If the positions of the first character (or last character) in the image data recognition result 315 and magnetic data recognition result 325 are not the same, for example, the strings can be shifted so these character positions match.

As a further alternative, if the position of each character in the image data recognition result 315 and magnetic data recognition result 325 is known, the strings can be shifted so that the characters at the same character positions match.

Further alternatively, one or a plurality of column offset correction patterns could be defined, and the columns could be shifted according to a specific correction pattern without analyzing how the characters are shifted. These column offset correction patterns could, for example, shift the strings a specific number of columns in a specific direction relative to each other, or shift the strings so that the first or last characters in the strings are aligned. The strings are them compared after the column alignment is corrected, and if the match rate between characters at the same column positions is less than or equal to a specified value, the column offset is corrected again using a different correction pattern. This trial and error process can be repeated until the match ratio between the compared characters exceeds a specified level.

After the alignment of the character strings of the image data recognition result 315 and magnetic data recognition result 325 is corrected, the comparison process compares and determines whether the character strings match. If there was no offset between the character strings, the characters are compared one by one starting from the first character in each string. Characters confirmed to be the same by this comparison are then used as the final recognition result. Characters that do not match might or might not be correct, and are therefore flagged as unrecognizable by outputting a question mark "?" in the corresponding column. The result of this comparison is output as the combined recognition result 335. A question mark is therefore output at the first and eighth characters in the example shown in FIG. 6 because the first and eighth columns do not match.

The recognized characters in the combined recognition result 335 are thus those characters that are recognized as the same characters in both the image data and magnetic data; the reliability of the combined recognition result 335 is therefore extremely high. The characters at the columns output as a question mark are characters that do not match in the image data and magnetic data recognition results. Because the recognition result could be wrong if either the image data or magnetic data recognition result is used, this embodiment of the invention uses neither the image data recognition result or the magnetic data recognition result if the results are not the same. Recognition errors can thus be eliminated with a very high degree of reliability.

While embodiments of the invention have been described and illustrated, further alternatives, modifications, variations and applications of the invention will be apparent to those skilled in the art in light of the teachings herein. Thus, the invention disclosed herein is intended to embrace all such alternatives, modifications, variations and applications as may fall within the spirit and scope of the appended claims.

What is claimed is:

1. A character recognition apparatus for recognizing a character string composed of a plurality of characters printed with magnetic ink on a print medium, the character recognition apparatus comprising:
   a magnetic sensor for detecting magnetism from the character string printed in magnetic ink and outputting magnetic data;
   an optical sensor for optically reading the character string printed in magnetic ink and outputting image data;
   magnetic recognition means for recognizing characters in the character string using the magnetic data output by the magnetic sensor, and outputting a magnetically-recognized character string;
   image recognition means for recognizing characters in the character string using the image data output by the optical sensor, and outputting an optically-recognized character string;
   column offset detection means for detecting a shift in column alignment of characters in the magnetically-recognized character string with respect to corresponding characters in the optically-recognized character string, wherein the column offset detection means determines that there is an offset in the character column alignment when the number of characters in the magnetically-recognized character string and the number of characters in the optically-recognized character string are not the same;
   column offset correction means for correcting the column offset and aligning corresponding characters of the magnetically-recognized and optically-recognized character strings, if the column offset detection means detects a shift in character column alignment, wherein the column offset correction means corrects the column offset by shifting one of the magnetically-recognized character string or the optically-recognized character string relative to the other according to a first correction pattern selected from two or more predefined correction patterns; and
   comparison means for comparing characters at corresponding positions in the magnetically-recognized and optically-recognized character strings based on the column alignment after column offset correction is performed by the column offset correction means, and outputting a combined recognition result of the character string based on the comparison;
   wherein, if a match rate of the character strings determined by the comparison means based on the column offset correction performed by the column offset correction means according to the first correction pattern is less than or equal to a specific rate, the column offset correction means corrects the column offset according to a second correction pattern selected from the two or more predefined correction patterns.

2. A character recognition apparatus as described in claim 1, wherein
   the magnetic sensor outputs magnetic position information denoting the position where magnetism of a particular character was detected, along with the magnetic data;
   the image recognition means detects the position of each character during character recognition, and outputs image position information denoting the corresponding detected positions; and
   the column offset detection means detects the column offset by comparing the position of the first or last character of the magnetically-recognized character string based on the magnetic position information and the corresponding position of the first or last character of the optically-recognized character string based on the image position information.

3. A character recognition apparatus as described in claim 2, wherein the column offset correction means aligns corresponding columns in the character strings based on position information contained in the magnetic position information for each character in the magnetically-recognized character string and position information contained in the image position information for each character in the optically-recognized character string.

4. A character recognition method for recognizing a character string comprising a plurality of characters printed with magnetic ink on a print medium, the character recognition method being carried out on a character recognition apparatus and comprising one or more processors implementing in the following steps of:
   detecting magnetism from the character string printed in magnetic ink and outputting magnetic data;
   optically reading the character string printed in magnetic ink and outputting image data;
   recognizing characters in the character string using the outputted magnetic data, and outputting a magnetically-recognized character string;
   recognizing characters in the character string using the outputted image data, and outputting an optically-recognized character string;
   detecting a shift in column alignment of the characters in the magnetically-recognized character string with respect to corresponding characters in the optically-recognized character string, wherein it is determined that there is an offset in the character column alignment when the number of characters in the magnetically-recognized character string and the number of characters in the optically-recognized character string are not the same;

correcting the column offset and aligning corresponding character columns of the magnetically-recognized and optically-recognized character strings, if a shift in the character column alignment is detected, wherein the column offset is corrected by shifting one of the magnetically-recognized character string or the optically-recognized character string relative to the other according to a first correction pattern selected from two or more predefined correction patterns; and comparing characters at corresponding positions in the magnetically-recognized and optically recognized character strings based on the column alignment after column offset is corrected, and outputting a combined recognition result of the character string based on the comparison;

wherein the method further comprises correcting the column offset and aligning corresponding character columns of the magnetically-recognized and optically-recognized character strings by shifting one of the magnetically-recognized character string or the optically-recognized character string relative to the other according to a second correction pattern selected from the two or more predefined correction patterns, if a match rate of the character strings based on the column offset correction operation according to the first correction pattern is less than or equal to a specific rate.

5. A computer readable medium storing a set of instructions adapted to perform the character recognition method of claim 4.

6. A character recognition apparatus as described in claim 1, wherein the combined recognition result of the character string output based on the comparison performed by the comparison means includes, for any character for which a satisfactory match was not obtained, a mark indicative of a satisfactory match not having been obtained.

7. A character recognition method as described in claim 4, wherein the combined recognition result of the character string output based on the comparing includes, for any character for which a satisfactory match was not obtained, a mark indicative of a satisfactory match not having been obtained.

* * * * *